United States Patent [19]
Wilken et al.

[11] 4,063,815
[45] Dec. 20, 1977

[54] APPARATUS AND METHOD FOR OPTICAL TRACKING AND AIMING

[75] Inventors: Joachim Wilken, Karlsruhe; Karl-Heinz Wiemer; Harald Kauer, both of Ettlingen, all of Germany

[73] Assignee: Dr. -Ing. Ludwig Pietzsch, Ettlingen, Germany

[21] Appl. No.: 669,173

[22] Filed: Mar. 22, 1976

[30] Foreign Application Priority Data

Mar. 27, 1975 Germany ............................ 2513760

[51] Int. Cl.² .............................................. F41G 1/40
[52] U.S. Cl. ..................................... 356/29; 89/41 E; 350/24; 350/52; 350/302; 356/254
[58] Field of Search ................. 33/241, 246; 89/41 E, 89/36 K, 41 TV; 350/21, 22, 24, 48, 52, 301; 356/254, 255, 29

[56] References Cited

U.S. PATENT DOCUMENTS

| | | | |
|---|---|---|---|
| 2,276,270 | 3/1942 | Gregory | 89/41 E |
| 2,281,772 | 5/1942 | Klemperer | 33/246 |
| 2,405,065 | 7/1946 | Tear | 89/41 E |
| 3,505,465 | 4/1970 | Rees | 89/41 TV |
| 3,602,088 | 8/1971 | Spring | 350/52 |
| 3,954,041 | 5/1976 | Mechulam et al. | 89/36 K |

FOREIGN PATENT DOCUMENTS 448,250  6/1936  United Kingdom ................ 89/41 E

OTHER PUBLICATIONS

Websters Third New International Dictionary, 1965, p. 1584.

*Primary Examiner*—Stephen C. Bentley
*Attorney, Agent, or Firm*—Burns, Doane, Swecker & Mathis

[57] ABSTRACT

The invention relates to an apparatus and method for optical tracking and aiming from a movable system, such as a vehicle. The apparatus may comprise a viewing device having a sighting mark moveable responsive to the position of an aiming mechanism control. The sighting mark may be superimposed on a field of vision observable in the viewing device, by stroboscopic illumination.

5 Claims, 3 Drawing Figures

APPARATUS AND METHOD FOR OPTICAL TRACKING AND AIMING

BACKGROUND OF THE INVENTION

Tracking and aiming devices find application in cross-country military vehicles such as tanks. In conventional tracking and aiming devices, aiming is difficult if not impossible when the vehicle is moving. Conventional systems provided means by which a target can be observed during vehicle movement, typically viewing ports or periscopic deflection viewing devices. In order to sight the target however, the observer must align the aiming device with the target. Typical aiming devices have only a small opening angle for viewing and therefore must be directed into substantial alignment with the target. During this process however, the observer cannot keep the target in sight in the means provided for observation. During travel over uneven ground or in the case of travel around a curve, the observer may easily lose the target completely. Whenever the aiming device is stabilized, i.e., whenever it is uncoupled in at least one axis from the movement of the vehicle, e.g. by means of a gyro arrangement, then the finding of the target with the aiming device will be made still more difficult because the observer experiences the movements of the vehicle while the aiming device does not.

Accordingly, a primary object of the present invention is to provide a target tracking and aiming device operable while the vehicle to which the device is attached moves over uneven terrain.

Another object of the present invention is to provide a method by which a target may be tracked by an aimable device such as a gun or energy transmitting device mounted on a moving vehicle.

Still another object of the present invention is to provide a means for tracking a target with an aimable device which may be employed in conjunction with a rotating periscopic viewing apparatus.

These and other objects and features of the invention will become apparent from the claims and from the following description when read in conjunction with the appended drawings.

THE DRAWINGS

DETAILED DESCRIPTION

Figure 1:
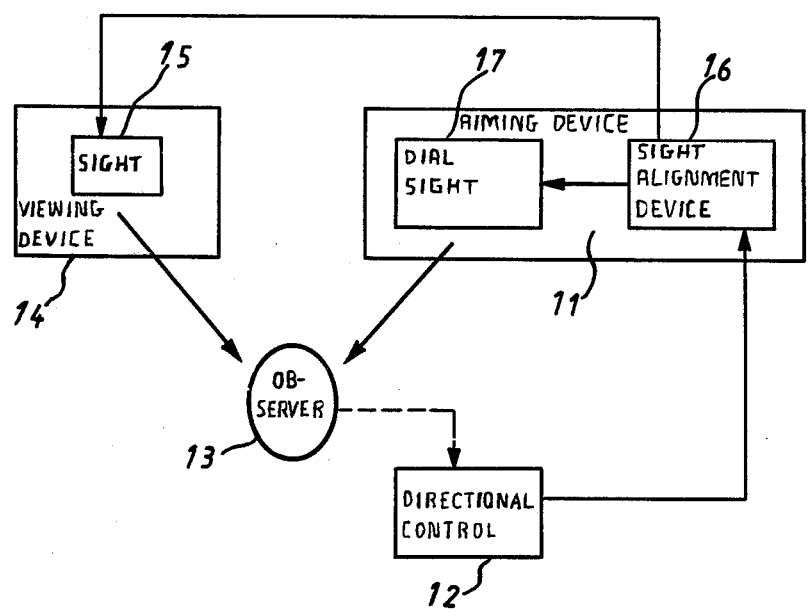
FIG. 1 is a block of one embodiment of the present invention.

Accordingly, a target tracking and aiming apparatus is provided in which at least one sighting mark may be superimposed onto the field of view of a viewing device. The movement of such a mark may be coupled in at least one axis with the movement of the aiming device so that alignment of the aiming device changes the position of the mark. In a perferred embodiment the aiming device may be stabilized in at least one axis, i.e., it is uncoupled from the movement of the system. The aiming device may be used in conjunction with a gun or energy transmitter or other aimable means for projecting an emission.

The viewing device, in the case of an advantageous embodiment of the invention, may be unstabilized, that is to say it is connected with the system in such a way, that it participates in the movement of said system.

The sighting mark may take the form of a pointer in the observation field of the viewing device, which pointer may preferably be coupled azimuthally in any desired form, e.g. mechanically, with the movement of the aiming device. A preferred embodiment of the present invention has application in conjunction with a viewing device with rotating image transfer elements which make possible an observation from a protected position, which are movable around the center of observation, and which are of sufficient number and rotate at sufficient speed to exceed the temporal resolving power of the human eye so that a panoramic view is provided at a center of observation. In such an application the mark may be produced stroboscopically, so that, therefore for a short time, it is optically superimposed onto the observation field of the viewing device at every revolution of the image transmitting elements. In a preferred embodiment a bar marking may be engraved on at least one of the two reflecting surfaces of the image transmitting element. The marking may be illuminated stroboscopically. The apparatus for aligning the sighting mark may include an angular position responsive means for controlling the point in time for switching on a stroboscope lamp during revolution of the image transmitting elements. The angular position responsive means may be operative to change the timing of the activation of the stroboscope lamp dependent on the angular position of the aiming device vis-a-vis the system.

An effortless tracking of and aiming at the target through the viewing device is made possible for the observer by the fact that the angular position responsive means in coupled with a aiming handle for swivelling the aiming device, and, typically, for positioning an armament of the system. When provision of a peep-sight is desired, then bar markings are engraved in both reflecting surfaces of the image transfering elements, both of which markings can be illuminated stroboscopically.

The invention also relates to a method for the optical observation and tracking of an object especially from a movable system, such as a vehicle with a separate aiming device and with a sighting device disposed on the system.

In the case of such a method, a mark indicating the alignment of the aiming device and blended into the field of vision of the sighting device is adjusted for the object appearing in the field of vision and the object is subsequently pursued by means of the aiming device.

Referring first to FIG. 1, a tracking and aiming device adapted for use on a vehicle is shown in the form of a block diagram. The device may comprise an aiming device 11, which can be swivelled by an observer 13 by way of a directional handle 12 in azimuthal and possibly also in an elevational direction, typically, to aim a vehicle armament.

A viewing or sighting device 14 may provide the observer with panoramic view. A sighting mark 15, for example a peep sight, may be superimposed on the field of vision. The observer can view the surroundings through the viewing device. The aiming device 11 may include sight alignment device 16, stabilized in at least one axis, e.g., the rotational axis for the azimuthal movement, (i.e., uncoupled from the movement of the vehicle around this axis). The alignment device 16 may be coupled with the sighting mark 15 in such a way that the latter is aligned at any time in the same direction as the optical axis of the aiming device 11. Therefore, the observer can observe the alignment of the aiming device by way of the peep-sight 15 in the field of vision of the viewing device 14. The aiming device 11 may have a dial sight 17, typically an eye piece or a moniter and may be e.g. a well known two axis stabilized periscope with an also well known directional control device.

In operation, the observer 13 may employ the panoramic viewing device 14 to orient himself within the terrain and to spot the target. If the observer 13 spots a target in the field of vision of the panoramic viewing device, then he immediately guides the sight alignment device 16 of the aiming device 11 by means of the directional handle 12 onto the target. The observer may continue to use the panoramic viewing device 14, because by swiveling the optical axis of the sight alignment device 16, the position of the sight mark 15 will be changed in a corresponding manner. Therefore the observer may track the target and aim at the target in the field of vision of the panoramic viewing device.

Whenever the sight mark 15 has been guided onto the target, then further tracking and aiming may be pursued through observation via the eye piece 17 of the aiming device 11. Tracking and aiming may at this point be taken over by some other observer, while the observer 13 continues to observe the terrain by way of the panoramic viewing device 14 and searches for other targets.

Figure 2:
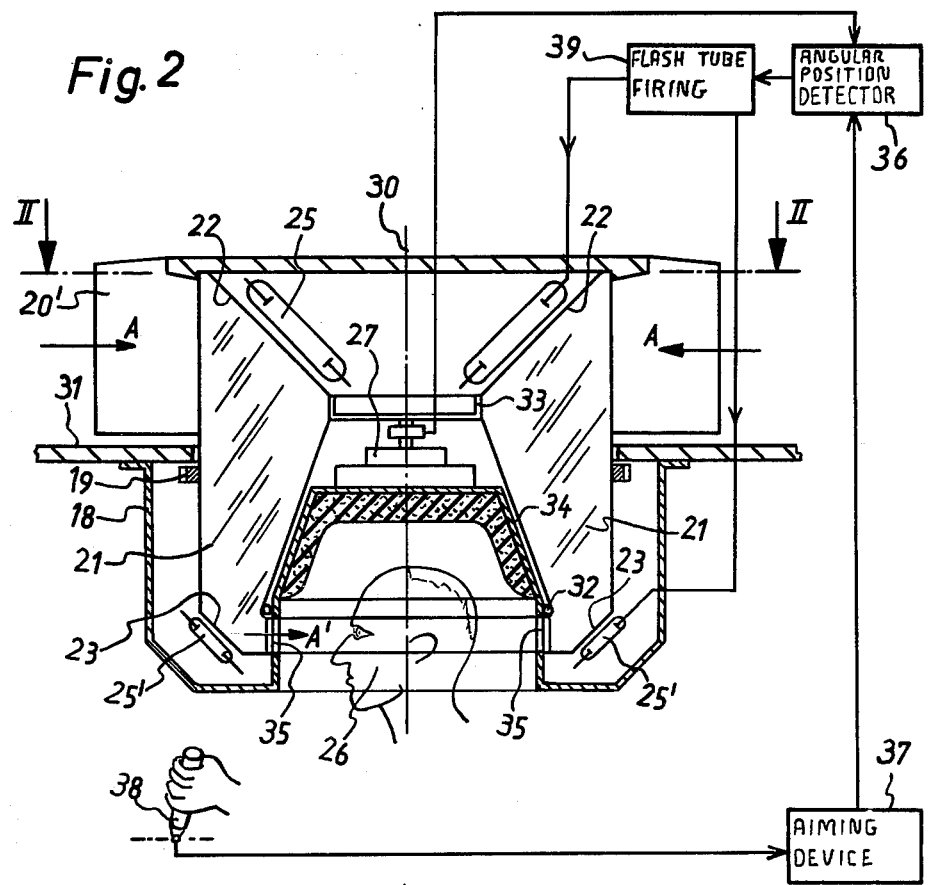
FIG. 2 is a cross-sectional view of a viewing and sighting device compatable with the embodiment of FIG. 1.

Referring now to FIG. 2, a cross-section view of a viewing and sighting device is shown. A housing 18 may be attached to a portion 31 of the body of a military vehicle in which prisms 21 or pairs of mirrors 22, 23 are rotatable by way of a ring driving mount 19. The pairs of mirrors 22, 23 may be mounted in bearings 32, 33 on a central part 34 of the housing, which forms a hood for shielding the head 26 of an observer. Light rays may enter in the direction of the arrows A into the pairs of mirrors and reach the observer by way of a panoramic viewing slit 35 made of a transparent material in the direction A'. The individual prisms 21 or pairs of mirrors 22, 23 may be distributed evenly around the axis of rotation 30 of the mirrors and are optically separated by radial walls 20, which extend radially outward at 20' for protection against shooting and fouling.

A marking 24, running radially, may be engraved in the mirror coating of the upper surface of the mirror 22 or the prisms 21. A mark may be engraved in the lower surface of the mirror 23 or the prisms 21 over the entire height of the surface. The engraved mark makes the mirror coating light-transmissive. From the rear side the mirror coated surfaces can be illuminated by flash tubes 25, 25' attached all around. Whenever both bar marks 24 are illuminated, then the observer 26 will see two perendicular strips in his field of vision superimposed on the image of the terrain. These two stripes may form a two dimensional sighting mark.

The flash bulbs may be ignited for a very brief time as compared to the speed of rotation of the prisms 21 or of the pairs of mirrors 22, 23, whose angular velocity is on the order of 16 Hz. At the same time their angular position in the 360°-field of vision of the panoramic viewing device may be changed by control of the switching pulses for the flash bulbs 25, 25'.

The angular position of the prisms 21 or of the pairs mirrors 22, 23 having the markings 24 may be detected by a potentiometer 27 which rotates synchronously with the pairs of mirrors 22, 23 or prisms 21. This angular position is fed into angular position detector 36. A change of direction of the optical axis of an aiming device 37 may also be detected by detector 36. The swivelling of the optical axis of the aiming device in turn is brought about by way of a directional handle 38 operable by the observer 26. A flash tube firing device 39 for the two groups of flash tubes 25, 25' is series connected with the detector. The devices 36 to 39 are separately from each other, i.e. not in the combination of FIG. 2, well known in practice and therefor need not be described in detail.

By operating the directional handle, the observer may change, by orienting the aiming device 37, the points in time for firing the flash tubes 25, 25' and, therefore, the angular position of the sighting marks with respect to the panoramic view. For example, the alignment of the sighting mark parallel to the optical axis of the aiming device 37 may be accomplished in such a way, that the firing pulses of the upper flash bulb 25 are shifted temporarily by a corresponding amount as compared to the firing pulses for the lower flash bulb 25'.

Instead of the sighting marks described employing stroboscopic illumination, a peep-sight with two marks, or in a suitable environment, only one mark, can be provided in a different manner, for example, in the form of a pointer blended into the field of vision, which pointer can be swivelled by electric or mechanical coupling with the aiming device.

Figure 3:
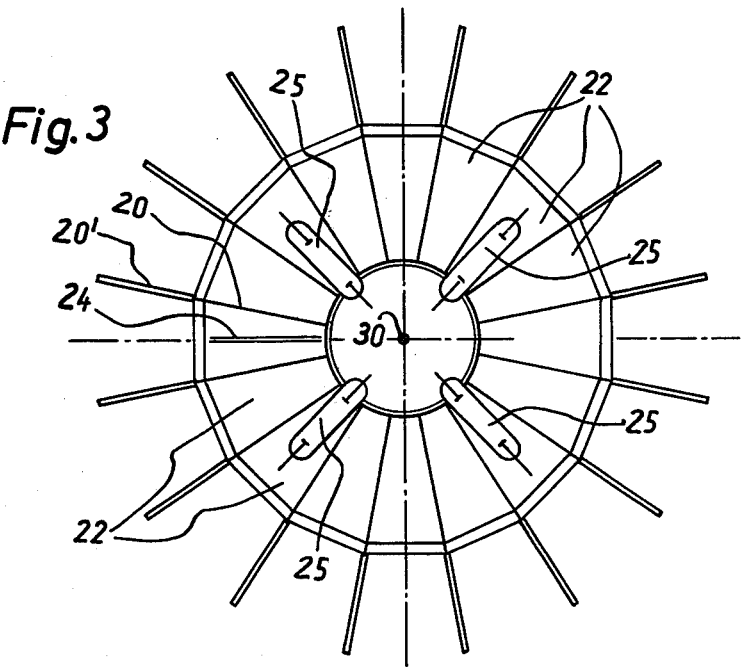
FIG. 3 is a cross-sectional view of the viewing and sighting device of FIG. 2 taken along section lines II—II of FIG. 2.

FIG. 3 is a cross-sectional view of the apparatus of FIG. 2 taken along section line II—II. Like structures are identified by the same numbers in both Figures.

The principles, preferred embodiments and modes of operation of the present invention have been described in the foregoing specification. The invention which is intended to be protected is not, however, to be construed as limited to the particular forms disclosed, since these are to be regarded as illustrative rather than restrictive. Variations and changes may be made by those skilled in the art without departing from the spirit and scope of the present invention.

What is claimed is:

1. An apparatus for optically tracking an object and indicating the alignment of an aimable device including:
    viewing means for making visual observations of the object, said means having a field of vision;
    a sighting mark superimposed on the field of vision; and,
    means for operatively coupling said sighting mark and aimable device so that the position of said sighting mark on the field of vision corresponds to the alignment of the aimable device, said viewing means including a plurality of periscopic deflection viewing devices radially distributed about a center of observation and rotated about the center of observation at a speed exceeding the temporal resolving power of the human eye in order to transmit an image of the object to a protected position.

2. The apparatus of claim 1 further comprising means for superimposing the sighting mark stroboscopically including a stroboscopic flash bulb device responsive to the rotational speed of the periscopic deflection viewing device.

3. The apparatus of claim 2 wherein said means for superimposing the sighting mark includes means for selectively illuminating a window in a mirror coated surface of at least one of said plurality of periscopes at a point in time corresponding to the orientation of the aimable device with respect to the terrain.

4. The apparatus of claim 1 further comprising an optical system, with a field of vision narrower than a field of vision of said viewing means, for aiming the aimable device, said optical system having an optical axis moved responsively to the position of said sighting mark.

5. The apparatus of claim 1 wherein said aimable device is uncoupled from the movement of the vehicle in at least one axis.

* * * * *